J. ULFELDT.
RELEASING AND CLUTCHING MECHANISM FOR PRESSES AND THE LIKE.
APPLICATION FILED JUNE 6, 1918.
1,333,689.
Patented Mar. 16, 1920.
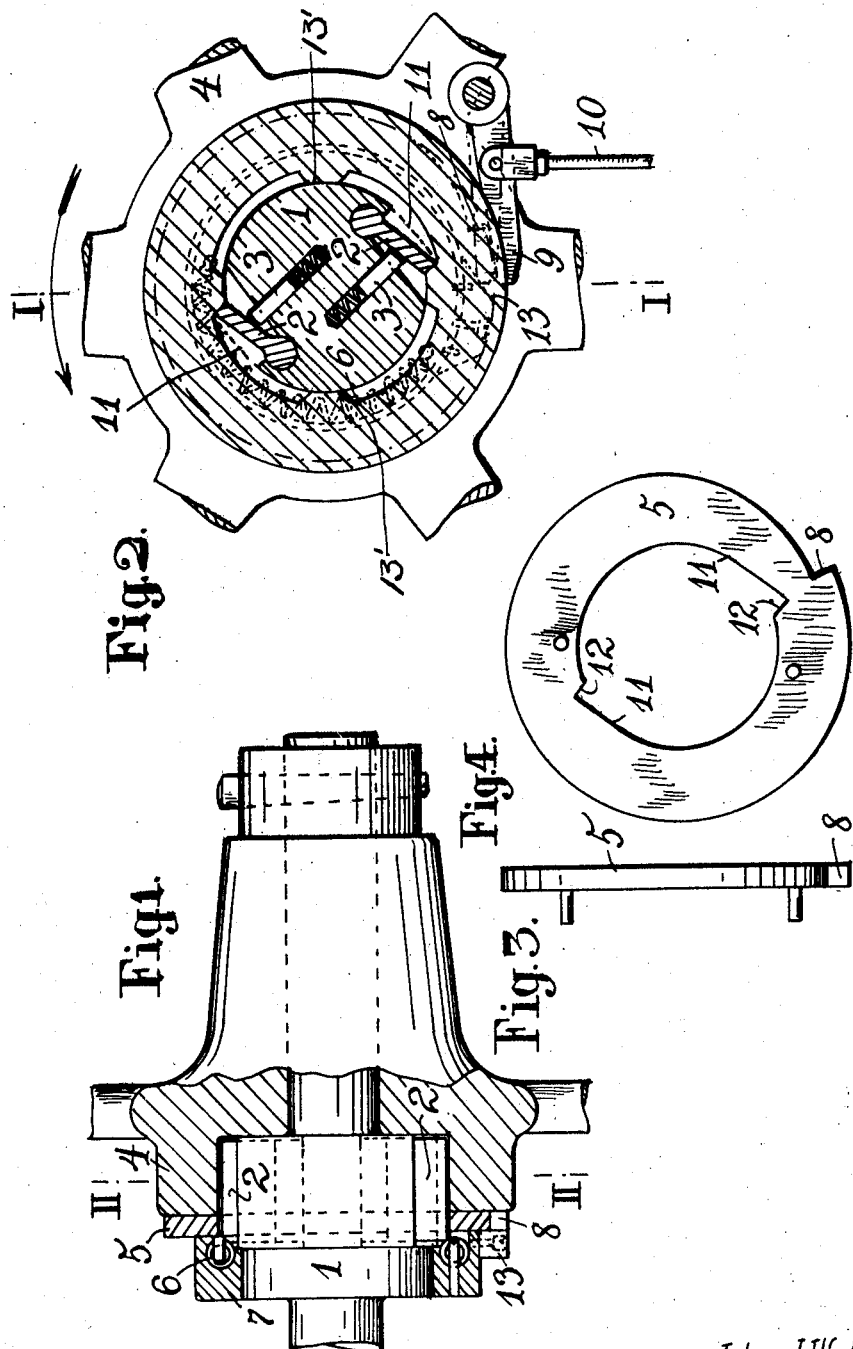
Johan Ulfeldt
Inventor
by Lawrence Langner
Attorney

UNITED STATES PATENT OFFICE.

JOHAN ULFELDT, OF STAVANGER, NORWAY.

RELEASING AND CLUTCHING MECHANISM FOR PRESSES AND THE LIKE.

1,333,689.   Specification of Letters Patent.   Patented Mar. 16, 1920.

Application filed June 6, 1918. Serial No. 238,592.

*To all whom it may concern:*

Be it known that I, JOHAN ULFELDT, a subject of the King of Norway, residing at Stavanger, in the Kingdom of Norway, have invented certain new and useful Improvements in Releasing and Clutching Mechanism for Presses and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a releasing mechanism or clutch for coupling a shaft to a driving mechanism inclosing the same such as a fly-wheel or the like, and particularly is adapted as releasing mechanism for presses and similar machinery. The apparatus according to the invention belongs to the type in which the connection between shaft and driving member is established by means of pawls or the like located in recesses in the shaft and actuated by springs which tend to press said pawls in an outward direction into recesses or against teeth in the inclosing driving member.

According to the invention the pawls besides the said notches or teeth in the driving member also engage a spring actuated ring, which can perform a limited rotating movement with regard to the shaft, and which by this movement actuates the pawl or pawls so that the same engage or disengage the driving member.

On the drawing is illustrated a preferred form of the invention.

Figure 1 is a sectional side view on the line I—I of Fig. 2.

Fig. 2 a cross section on the line II—II of Fig. 1, and

Figs. 3 and 4 respectively show side view and front view of the releasing ring.

As seen on Fig. 2 shaft 1 is provided with pawls 2 located in recesses in said shaft and engaged by spring actuated pins 3 which tend to press the pawls radially outward.

With their free ends the pawls engage the inner surface of the hub 4 of a pulley or fly wheel, and the same inner surface is provided with notches or teeth 13' which may be engaged by the free ends of pawls 2.

At the same time the said pawls 2 are engaged by a ring 5, which is connected to shaft 1 by means of annular screw springs 6 placed in an annular groove in a ring 7 fastened on shaft 1. One end of the said springs is fastened to ring 7, while the other end is fastened to ring 5.

Said ring 5 on its exterior circumference is provided with a notch 8, which may be engaged by a pawl 9 movable by hand or otherwise, by means of rod 10.

When the shaft is not driven from fly wheel or pulley 4 the end of the pawl 9 engages notch 8 in ring 5 and thereby keeps said ring in such a position with regard to shaft 1 that the interior cam faces 11 maintain the pawls pressed into their interior position, so that they are out of engagement with the notches or teeth at the inside of hub 4. The fly wheel or pulley in that case runs free.

If the pawl is now pulled down into the position indicated on the drawing, ring 5 is partly turned by means of spring or springs 6 into such a position that pawls 2 fall into the interior notches 12 of ring 5 engaging at the same time the notches in the inner surface of hub 4, so that the shaft is connected with the same and rotated. Ring 5 follows shaft 1 until it is again stopped by pawl 9 and pushed back so that the pawls 2 are disengaged from the hub.

The pawl 9 as will be noted besides disengaging pawls 2 also acts directly to stop the rotation of shaft 1.

It will be understood, of course, that the press or machine with which the clutch is used is provided with a brake which stops the rotation of the driven member 1 (due to its inertia) before the same rotates a sufficient distance to be reëngaged by the driving member. However, the releasing mechanism is protected from unnecessary stresses or breakage in case the brake shaft is not stopped immediately, by a boss 13 provided on the shaft 1 in such a manner that it pushes pawl 9 out of engagement with notch 8 if the shaft is still rotating thus releasing the shaft to make another revolution, and this action is continued until the shaft has been stopped.

Claims:

1. In a clutching mechanism, a driven shaft, a driving member loosely mounted thereon, spring actuated pawls on said shaft, teeth in said driving member, said pawls and teeth serving to couple the shaft and the driving member together, a notched ring adjustably mounted about said shaft, the teeth in said driving member and the notches in said ring being adapted to engage said pawls, a collar member disposed on said shaft, and a spring acting on said ring and housed in said collar member connected with said shaft.

2. In a clutching mechanism, a driven shaft, a driving flywheel loosely mounted thereon, spring actuated pawls on said shaft, teeth in the hub of said fly wheel, said pawls and teeth serving to couple the shaft and the flywheel together, a notched ring axially alined with said shaft and bearing on said pawls, the teeth in said driving member and the notches in said ring being adapted to engage said pawls, a collar member rigidly connected with said shaft, said collar being formed with an annular recess, and a number of spiral arcuate springs acting on said ring and housed in the recess in said collar member.

3. In a clutching mechanism, a driven shaft, a driving member loosely mounted thereon, spring actuated pawls in said shaft, teeth in said driving member, said pawls and teeth serving to couple the shaft and driving member together, a notched ring adjustably mounted about said shaft, the teeth in said driving member and the notches in said ring being adapted to engage said pawls, a collar member disposed on said shaft, said ring being held against axial displacement between the driving member and said collar, a spring disposed in said collar and acting to hold the ring in such position that the pawls engage the teeth, a manually operated pawl for holding the ring in such position that the pawls are disengaged from the teeth, and means for automatically releasing said manually operated pawl to prevent injury to the mechanism in over-running.

4. In a clutching mechanism a driven shaft, a driving member loosely mounted thereon, spring actuated pawls on said shaft, teeth in said driving member, said pawls and teeth serving to couple the shaft and the driving member together, a notched ring adjustably mounted about said shaft and rotating therewith, the teeth in said driving member and the notches in said ring being adapted to engage said pawls, a spring connected to the shaft and to the ring and adapted to move and maintain the ring in such position that the spring actuated pawls are thrown into engagement with the teeth, a notch on the outer periphery of said ring and an independently actuated pawl adapted to engage in said notch to hold said ring to retract the pawls in the shaft so as to unclutch, a boss being provided on the shaft to remove the independently actuated pawl and release the ring after the coupling pawls have been removed from their teeth.

In testimony that I claim the foregoing as my invention, I have signed my name in presence of two subscribing witnesses.

JOHAN ULFELDT.

Witnesses:
  CHARLES FORMAN,
  D. ST. CLAIR GAINER.